A. P. LAFORGE.
RESILIENT TIRE.
APPLICATION FILED MAY 19, 1916.

1,253,985.

Patented Jan. 15, 1918.

WITNESSES
W. C. Fielding

INVENTOR
Auguste P. Laforge
BY Richard B. Owen.
ATTORNEY

UNITED STATES PATENT OFFICE.

AUGUSTE P. LAFORGE, OF LINCOLN, CALIFORNIA.

RESILIENT TIRE.

1,253,985.  Specification of Letters Patent.  Patented Jan. 15, 1918.

Application filed May 19, 1916. Serial No. 98,636.

*To all whom it may concern:*

Be it known that I, AUGUSTE P. LAFORGE, a citizen of France, residing at Lincoln, in the county of Placer and State of California, have invented certain new and useful Improvements in Resilient Tires, of which the following is a specification.

My invention relates to a resilient tire, and the most important object thereof is to provide a tire of this character which is constructed of overlapping and angularly directed resilient strips which form a tire body of metal as resilient as a tire of rubber when inflated.

Specifically speaking, another object of the invention resides in slitting two layers of material diagonally in substantially opposite angular relation, superposing said strips and then bending the same circumferentially and also bending the same to form a substantially cylindrical tube whereby a complete resilient metal tire body is formed.

A further object resides in covering the body thus formed and in providing means for fastening the tire body and cover to the felly of the wheel.

With the above and other objects in view, I will now proceed to describe the specific embodiment of the present invention which, by way of illustration, I have shown in the accompanying drawings wherein.

The tire, as herein illustrated, comprises two layers designated A and B, the former being the inner layer and the latter the outer layer.

Figure 3:
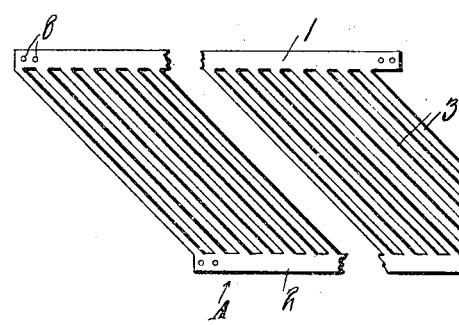
Fig. 3 is a similar view of another of the layers.

The inner layer is formed by stamping or pressing a sheet of metal and consists of two marginal edges 1 and 2 which are connected by a plurality of diagonally extending strips 3 which are formed by slitting the strip diagonally, as shown in Fig. 3. The metal from which the strip A is formed must be resilient and capable of being bent to a considerable degree. The outer strip B is similarly formed, that is to say, it is provided with two marginal edges 4 and 5 connected by diagonally extending strips 6 formed by diagonally slitting the top strip B. However, the strip B differs from the strip A in that the strips 6 are disposed in a direction opposite to that of the strips 3 of the layer A and hence when the two are overlapped, the strips are disposed substantially at right angles to each other.

Figure 1:
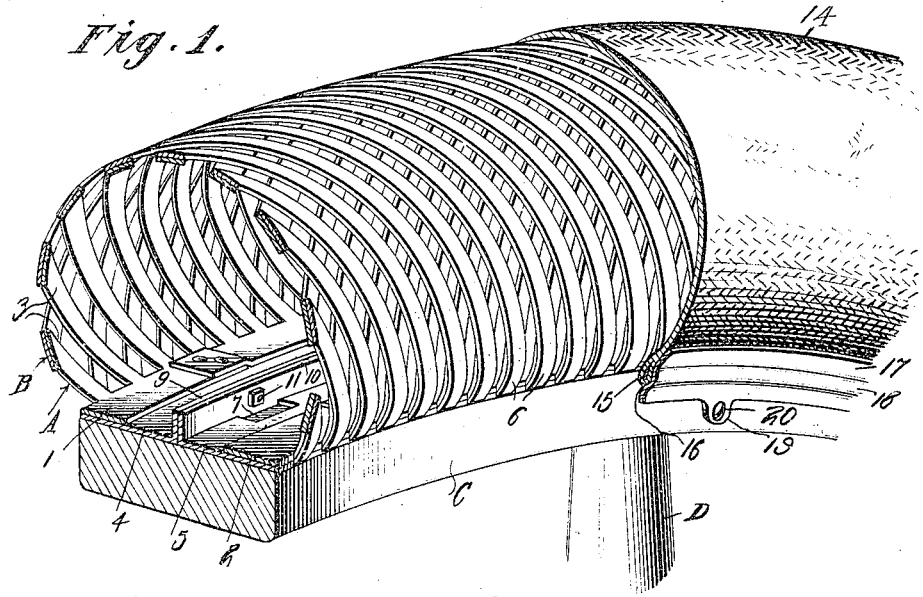
Figure 1 is a view in perspective, with parts broken away showing a tire constructed according to my invention.
Figure 2:
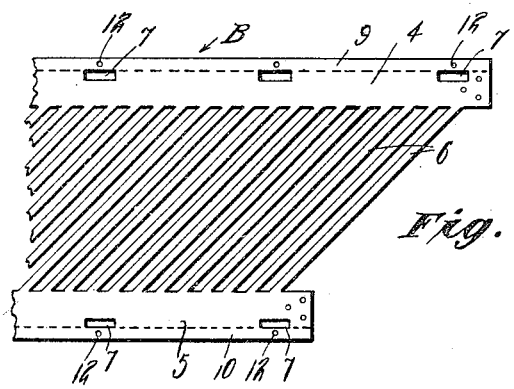
Fig. 2 is a top plan view of one of the tire layers.
Figure 4:
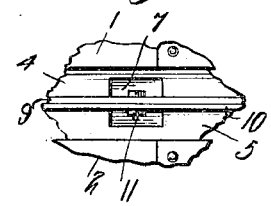
Fig. 4 is a detail plan of the fastening means.

In making up the tire the edges 4 and 5 of the strip B are slotted, as shown at 7, for purposes to be hereinafter set forth. Also the strip A has along its edge at the ends, the rivet holes 8. The strip A is bent or formed into a substantially tubular shape and also bent circumferentially, as shown in Fig. 1. The strip B is then superposed on this and similarly bent. Thus the strip A is, in reality, inclosed within the bent strip B. The margins 4 and 5, as shown at 9 and 10, are bent outwardly so as to provide vertical flanges for the strip B and are connected together by bolts 11 extending through holes 12 opposite each opening 7, the openings 7 providing for access in order to reach the nuts 13 which secure the flanges together. The overlapping ends of the strip A are riveted together by rivets fastened through the holes 8. The body of the tire thus formed will be found to have a base formed by the margins of the strips and the tread portions will comprise a plurality of overlapping diagonally directed resilient strips which will afford nearly as much resiliency if not more than a pneumatic tire.

For the sake of appearance and also to protect the strips from wear, a covering 14 of rubber, canvas, leather or the like is wrapped around the tire and has its edges provided with a wire 15 which forms a bead 16. The tire is secured in place, after the covering 14 has been applied thereto by simply sliding it on the felly C of a wheel D and then applying on each side thereof the clencher rings 17 which have the annular channel portions 18 to accommodate the bead 16. The clencher rings 17 are provided with lugs 19 through which screws 20 extend in order to hold the rings against the felly and thereby secure the tire in place.

In this manner an inexpensive metallic tire, capable of indefinite use, may be constructed.

While in the foregoing, I have described the specific embodiment of the present invention, it is nevertheless to be understood, that, in practice, I may resort to such modifications of my invention as may fall within the scope of the appended claims.

I claim:

1. A resilient tire for vehicles comprising a circumferentially bent strip of resilient material having diagonally extending slits intermediate its marginal edges and substantially tubular shape in cross section, a similar strip overlying the first named strip and having the slits therein at a different angle than the slits in the first named strip, whereby the portions separating the slits of each strip provide oppositely directed overlapping springs forming a resilient tread surface, and means for securing the margins of both strips together.

2. A resilient tire comprising a pair of resilient sheet metal members bent into tubular shape and being adapted to fit upon a wheel rim, the said members being arranged one within the other, the adjacent edges of the outer member being turned outwardly to provide abutting flanges, the metal adjacent said flanges being provided with spaced openings, and the said flanges adjacent said openings being provided with apertures to receive securing bolts.

3. A resilient tire comprising a pair of resilient sheet metal members bent into tubular shape and being adapted to fit upon a wheel rim, the said members being arranged one within the other to provide inner and outer members, the adjacent edges of said outer member being turned outwardly to provide abutting flanges, the metal adjacent said flanges being provided with spaced openings, the said flanges adjacent said openings being provided with apertures to receive securing bolts, the ends of said inner member being secured together and the edges of said inner member being spaced away from the said flanges and openings.

In testimony whereof I affix my signature in presence of two witnesses.

AUGUSTE P. LAFORGE.

Witnesses:
J. MICHEL,
FRANK CHEVALLIER.

Copies of this patent may be obtained for five cents each, by addressing the "Commissioner of Patents, Washington, D. C."